United States Patent Office 2,918,495
Patented Dec. 22, 1959

2,918,495

PROCESS FOR PREPARING A MENTHADIENE KETONE AND COMPOSITION

Albert B. Booth, Houston, Tex., assignor to The Glidden Company, Cleveland, Ohio, a corporation of Ohio No Drawing. Application September 30, 1957
Serial No. 686,896

2 Claims. (Cl. 260—587)

This invention relates to a process for preparing a menthadiene ketone and to a novel composition of matter. My process provides a unique flavor and odor composition of matter of the spearmint type. My process can be adapted to the preparation of the new composition in commercial quantities.

Oil of spearmint is an important flavoring material. The oil comprises largely 1-carvone, that is, about 50%, 1-limonene, and many minor components such as carveol, dihydrocarveol and the esters. Each of these components contributes to spearmint flavor, but none of them is by itself a complete spearmint flavor. In fact, any combination of the spearmint components known to the art does not produce a complete or fully satisfactory spearmint flavor. That is a common situation with flavors, and to produce a satisfactory artificial product, it is usually necessary to include in the formulation compounds which have not been found naturally in the flavor, or perhaps have not been found in nature at all. By the use of such "artifacts," excellent artificial flavors of many kinds are available today.

Working along these lines, I have prepared a new synthetic chemical, not previously reported, to the best of my knowledge, as having been found or synthesized, which imparts, when used in small proportions, a desirable, lively and natural quality to formulations of artificial spearmint oil.

It is an object of this invention to provide a new composition of matter.

Another object is to provide a new synthetic chemical flavoring substance.

A still further object is to provide a novel ketone of the menthadiene structure possessing a basic flavor.

A further object of this invention is to provide a process for preparing a novel menthadiene ketone. Other objects will be found in the description of my invention, which follows.

The foregoing objects of my invention are accomplished by my discovery that carvone can be treated to convert it to a new compound which is an isomer thereof. Briefly my invention comprises heating carvone with an enolization catalyst and recovering therefrom a fraction rich in said new compound. The compound, which I shall call "Spicatone" after the botanical name of the spearmint, "Mentha spicata," possesses unexpected properties, both physical and chemical over its isomer, carvone. Thus, carvone and spicatone are very different in odor, flavor and chemical reactions and are not in any sense equivalent or interchangeable. Their physical properties, such as their boiling points, are also substantially different. Thus, I wish to emphasize that if carvone is the sole p-menthadiene-2-one in a synthetic spearmint oil the flavor of the oil will be much less comparable to a natural spearmint oil than if a small amount, say 0.3 to 3% spicatone is also present. On the other hand, if spicatone is the sole p-menthadiene-2-one present then the artificial oil is even more unlike the natural oil.

It will be recognized that many isomers of carvone have been found in nature or have been synthesized. Thus, carvacrol is a phenol which occurs naturally and which is also very easily produced by isomerizing carvone under certain conditions which differ widely from those we employ. Piperitenone and isopiperitenone are isomers of carvone and occur naturally in certain peppermint oils. Verbenone is another carbone isomer which occurs in nature and which is readily synthesized from turpentine. Many other isomers of carvone are known, but despite the fact that so many such isomers are recognized and have been thoroughly studied, none of these $C_{10}H_{14}O$ compounds have been found valuable in contributing to organoleptically desirable spearmint oil formulations. It is therefore surprising that the isomer spicatone, 5,8(9)-p-menthadiene-2-one does possess the unique value described.

Carvone, 6,8(9)-p-menthadiene-2-one, $C_{10}H_{14}O$, is a menthadiene ketone and has the following structural formula.

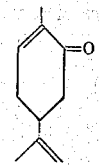

Carvone is a liquid and can be obtained from spearmint oil in the form of its levo-isomer and from caraway oil in the form of its dextro-isomer. The following physical properties have been reported for the various optical forms: d-, $$d_4^{18.7°}\ 0.9611$$

B.P. 230° C./755 mm. ($b_5=83°$ C.); $N_D^{18.7}$ 1.4993; $[\alpha]_D^{20°}+62.32°$; l- B.P. 230–231° C./763 mm.;

$$d_{15°}^{15°}\ 0.9652$$

$N_D^{20°}$ 1.4988; $[\alpha]_D^{20°}-62.46°$; dl-, B.P. 230–231° C., $$d_{15°}^{15°}\ 0.9645$$

$N_D^{20°}$ 1.5003. It is used, in the preferred embodiment of my invention, as the starting material. Synthetic carvone, however, can also be used as a starting material as well as spearmint oil itself.

It is known to isomerize carvone, but heretofore only by procedures leading to aromatization with formation of the phenol, carvacrol. Thus carvacrol is obtained practically quantitatively by heating carvone with palladium or with aqueous acids such as sulfuric or oxalic. By use of the relatively anhydrous enolization conditions as will be described hereinafter and by recovering the spicatone as it is formed from the carvone, I avoid almost completely such undesirable side reactions as aromatization and polymerization of carvone.

I believe that in the presence of enolization catalysts that carvone is converted to a minute extent to spicatone at relatively low temperatures, say 100° C., and that since heat and enolization catalysts cause spicatone to revert almost entirely to carvone, it is desirable to remove spicatone from enolization conditions by distilling it away from the enolization mixture as rapidly and at as low temperatures as possible. Thus I prefer to employ an efficient fractionating column with as low pressure drop from condenser to stillpot as is economic and to use as high vacuum as is available. These conditions minimize the isomerization of spicatone to carvone. Pressures in the order of 1 to 50 mm. at the condenser are suitable though we prefer pressures of 1 to 20 mm. to assure maximum yield of organoleptically desirable product. Such pressures are commonly used in producing high quality flavor and perfumery products. Pressures measured in the stillpot may be substantially higher due to pressure drop through the column. The temperature of the enolization reaction will be governed by the boiling point of the mixture at the pressure in the stillpot but will ordinarily be about 90° to 150° C. under good distillation conditions using conventional fractionation columns. The mechanism for the isomerization of carvone to spicatone is believed to be as follows:

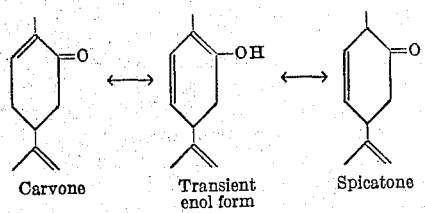

Carvone    Transient enol form    Spicatone

In the preferred aspect of my invention for the preparation of spicatone I heat carbone in the presence of an enolization catalyst in a suitable column still as defined above and fractionate off from the top of the column a distillate rich in spicatone.

In another aspect of my invention I can use as a starting material a mixture rich in carvone, for example, spearmint oil. The mixture is heated in the presence of an enolization catalyst and thereafter a fraction rich in spicatone is recovered by fractional distillation while maintaining the enolization catalyst in the still pot.

For the preparation of spicatone according to either embodiment of my invention, the preferred procedure is to charge the carvone and enolization catalyst into the pot of a column still, heat and slowly distill off at high reflux and at reduced pressure a distillate rich in spicatone. The distillate can then be refractionated to obtain a substantially completely pure spicatone. Since there is an appreciable spread between the boiling points of carbone and the new compounds, the separation is not difficult. The temperature is chosen by regulating the absolute pressure so that the spicatone which is formed can survive, since heating at, say, 150–200° C. or higher will cause isomerization of spicatone to carvone.

I use the terms "enolization" and "enolization catalysts" because I believe the mechanism of conversion of carvone to spicatone involves a transient and unisolable form of carbone or spicatone as illustrated above, and it would be in keeping with organic chemical theory to regard this transient form as an enol, capable of decomposing either to carvone or to spicatone. The enol forms of monoketones are not readily isolable except as derivatives, say their ethers, esters or their salts prepared under anhydrous conditions as by use of Grignard reagents. Enolization is a reversible process and I believe that when heated with enolization catalysts carvone forms an equilibrium mixture with spicatone which probably contains only small amounts of spicatone at most, but from which spicatone may be recovered readily in fair concentration by removing it from the heated equilibrium mixture by distillation thereby causing more carvone to isomerize to spicatone in the heated mixture.

Enolization of carbonyl compounds is known to be catalyzed by bases, by acids and metallo-organic compounds such as Grignard reagents, sodium alcoholates, aluminum alcoholates such as aluminum isopropoxide, t-butoxide or a phenolate. I find that even such weak bases as sodium soaps are effective catalysts, useful in my process. Thus, in the absence of such catalytic materials, crude carvone may be carefully fractionated to produce purified fractions of high purity carvone. However, if catalysts of the type disclosed here are present in the still pot, then the fractions collected will be low in carvone purity since they will contain substantial amounts of spicatone. Such fractions can be redistilled in the absence of catalyst to yield pure spicatone. Thus spicatone is easily isolable and stable enough for storage and use. If spicatone, however, is heated with catalyst of the type described, it reverts to carvone.

I have found, however, that strong bases tend to destroy carvone and/or spicatone with formation of useless polymer. Therefore, I prefer to employ weaker bases such as amines, e.g. triethanol or triisopropanol amines, 1-hydroxy ethyl-2-heptadecenyl glyoxalidene, pentaethylene hexamine, monostearyl ethylene diamine, etc., in general, basic nitrogen compounds. It will be appreciated that such catalysts should be substantially non-volatile at the temperatures employed as otherwise, their presence in the fractionating column would cause the spicatone to revert to carvone, thus nullifying the operation.

Mildly alkaline soaps such as alkali or alkaline earth soaps of the higher fatty acids are suitable catalysts and do not cause excessive side reactions. Likewise, aluminum alkoxides and phenolates are effective.

Strong acids such as hydrochloric, sulfuric or oxalic are undesirable since they cause the irreversible isomerization of carvone or spicatone to the aromatic, carvacrol. For these, I therefore substitute the weaker organic acids such as the higher fatty acids, stearic, palmitic, oleic or the resin acids as represented by rosin, all of which are sufficiently nonvolatile that they remain in the distillation pot during the isomerization distillation.

It will be evident to those skilled in the art that within the broad scope of enolization catalysts discussed that many suitable catalysts could be chosen aside from those specifically mentioned and that the efficacy of such catalysts can be readily determined by conducting the process herein described and assaying the distillate for spicatone by standard infrared or ultraviolet methods or even by refractive index determination. Also, if optically active carvone is being isomerized, the distillate is readily analyzed by polarimetry, thanks to the much higher rotatory power of the spicatone.

The novel compound which I prepare by the process of my invention has the following structural formula and characteristics:

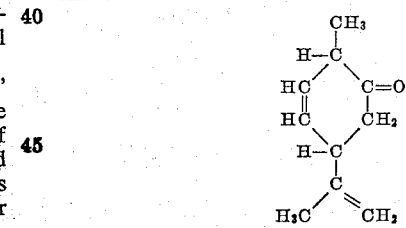

$C_{10}H_{14}O$; 5,8,(9)-p-menthadiene-2-one. Pure spicatone has the following properties each of which is widely different from the corresponding property of carvone:

Boiling point: 67° C. at 5 mm. Hg absolute pressure (carvone $b_5 = 83°$ C.); $d_{25}$ 0.9406; $[\alpha]_D \pm 163.9$; $N_D^{25}$ 1.4816.

The dl form has no rotation, and the d form has an equal but opposite rotation to that of the l-form. Spicatone does not solidify on Dry Ice whereas carvone does.

The following specific examples are offered to illustrate the conditions employed in the preparation of spicatone. It is to be understood that various modifications can be made by those skilled in the art and I do not desire to limit myself to the specific conditions employed hereinbelow.

Example 1

This example illustrates the use of a nitrogen base catalyst or an amine.

Three hundred nine grams of l-carvone from spearmint oil was charged into a still pot with 3 grams of 1-hydroxyethyl-2-hepta-decenyl glyoxalidene (Carbide and Carbons "Amine 220," a technical product). The still pot was surmounted with an efficient packed column and the mixture was slowly distilled at 10 mm. head pressure. Since carvone boils at 100° C. at 10 mm. distillate was taken off at such a rate that the head temperature was held between 95° and 98° C. The composition of the distillate was followed by measuring the index of refraction of fractions and averaged about 25% spicatone. When 265 grams of distillate had been collected, the distillation was stopped due to the small amount remaining in the pot since there was considerable column holdup. Upon draining the column back into the pot, there was recovered a total of 45 grams as bottoms, leaving a loss of 2 grams. This was doubtless mostly material still held in the column on the surfaces. The combined distillate showed an index $N_D^{25}$ 1.4929 corresponding to slightly over 25% spicatone.

The 45 grams of bottoms was steam distilled to recover 36 grams of carvone. The final residue was then 9 grams of which 3 grams was the catalyst and 6 grams was polymer.

The spicatone recovered amounted to 25% of 265 grams=66 grams. Allowing a 9 gram loss of carvone as polymer and otherwise, the yield of spicatone on the carvone consumed was about 88%.

The composition of the 265 grams of distillate was checked by infrared and, as will be shown in the next example, the spicatone present in the distillate can be recovered practically quantitatively by fractionation.

*Example 2*

This example demonstrates the use of a fatty acid soap as an enolization catalyst in the process of my invention.

A fatty acid soap catalyst was prepared by neutralizing a quantity of commercial 2-ethylhexanoic acid in methanol with methanolic caustic potash. The methanol was then evaporated under vacuum leaving the solid soap. A 1% solution of the soap in distilled water showed a pH of 9.0.

Six hundred grams of l-carvone from spearmint oil was mixed with 6 grams of the soap, and distilled as in Example 1. The distillation was stopped when 493 grams of distillate had been recovered. The distillate showed an index $N_D^{25}$ 1.4935 which corresponds to about 21% spicatone. There was a residue of 108 grams which yielded 53 grams of carvone on steam distillation. The 493 grams of distillate was then fractionated at 5 mm. head pressure. The distillation and analytical data are as follows:

| Fraction | $B_5°$ C. | Weight, Grams | $N_D^{25}$ | Percent Spicatone | Grams— Spicatone |
|---|---|---|---|---|---|
| 1 | 67 | 27 | 1.4815 | 100 | 27 |
| 2 | 67.5 | 22 | 1.4815 | 100 | 22 |
| 3 | 67.5 | 26 | 1.4815 | 100 | 26 |
| 4 | 75 | 25 | 1.4840 | 84 | 22 |
| 5 | 74 | 25 | 1.4950 | 12 | 3 |
| 6 | 82 | 25 | 1.4960 | 5 | 1 |
| 7 | 83 | 312 | | | |
| 8 (residue) | | 22 | | | |
| | | | | | 101 |

Thus, there was charged 104 grams spicatone of which 101 grams was recovered in different states of purity ranging up to about 100%. The yield of spicatone on the carvone consumed was 65%.

As noted, in this example, the amount of spicatone was not quite as high as with the amine catalyst. The amine catalyst appears to be superior in selectivity between the equilibration and dimerization reactions, minimizing the latter. It appears that factors other than basicity of catalyst may be involved.

Thus, while all bases produce more or less spicatone, they differ in the amount of side reaction products produced. Evaluation of any particular base is readily carried out by proceeding as in Example I.

*Example 3*

This example illustrates the use of caustic in the process of my invention.

Three hundred twenty-two grams of half active, synthetic d-carvone was charged to a still pot, and one gram of solid caustic potash was added. The distillation was carried out as in the previous examples, but the distillate averaged only about 12% of spicatone. The pot temperature climbed rapidly, and the distillation was stopped when it reached 192° C. Residue at this point was 148 grams. By steam distillation of the residue, some carvone and carvacrol were recovered, but the largest part of the residue was polymer.

A small portion of the distillate was agitated rapidly with excess saturated $Na_2SO_3$ and glacial acetic acid was fed in as the carvone reacted. The pH was held at about 8, as measured on the Beckman pH meter. When no more reaction occurred, the mixture was extracted with naphtha, and the spicatone was recovered from the naphtha extract by evaporation of the naphtha under vacuum. The aqueous phase containing the carvone as bisulfite adduct was treated with excess sodium hydroxide to recover the carvone.

Spicatone does not react with neutral sulfite in the cold and can thus be separated from carvone thereby.

*Example 4*

This example demonstrates the use of an organometallic compound in the process of my invention.

Three hundred cc. of t-butanol and 100 cc. of benzene were charged to a column still and 150 cc. of material was fractionated off to produce dry t-butanol as a pot residue. Then, 1 gram of aluminum foil was added and the mixture was refluxed until the aluminum dissolved. Carvone, in the amount of 350 grams, was then added and the t-butanol was removed under vacuum, so as to leave the aluminum t-butoxide dissolved in the carvone. From here on the procedure was the same as in the preceding examples, whereby a distillate containing spicatone was removed from the top of the column. Although the catalyst gave a high concentration of spicatone in the distillate initially, its activity was not maintained at a high level, probably due to the fact that aluminum t-butoxide slowly breaks down on heating. A more stable organometallic compound would therefore be more suitable or alternatively additional fresh catalyst might be added from time to time during the fractionation.

*Example 5*

Four hundred and fifty-eight (458) grams of carvone and 50 grams pine rosin (a mixture of resin acids) were charged to a stillpot surmounted with a 1″ x 60″ packed column. A head pressure of 10 mm. mercury absolute pressure was maintained and distillation was begun. A reflux ratio of 20:1 was employed. An appreciable amount of spicatone was formed and was collected in the distillate.

While the enolization catalysts demonstrated above are capable of converting carvone to spicatone, they differ considerably in their ability to catalyze the desired reaction and in the extent of side reactions such as aromatization and polymerization that they produce. The catalyst and conditions of Example 1, i.e. the amine catalyst, represent the best known means of practicing the invention, although other enolization catalysts can be selected and used by following the teachings disclosed herein.

Since the amount of spicatone in the distillation pot is very small at any specific time, it becomes very difficult to fractionate off pure spicatone from the head of the fractionating column during the isomerization step. I prefer to collect spicatone at concentrations of say 10 to 40% from the distillation and then to refractionate these fractions to obtain the pure product. To accomplish this collection of such concentrations of spicatone, it suffices to conduct the distillation at such a rate that the temperature at the head of the column is a few degrees below that corresponding to the boiling point of carvone. At lower reflux ratios or with less efficient columns, the boiling point at the head of the column will approach that of carvone and the concentration of spicatone in the fractions will be small. It will be appreciated, however, that since a chief use for spicatone will be in the fortification of natural spearmint oils or in the production of artificial spearmint flavors where carvone is also present and in a major proportion it is not necessary to isolate pure spicatone. Concentrations of spicatone ranging from 10–40% as obtained easily from the isomerization distillation are useful for supplying spicatone to organoleptic formulations and since the only impurity present is carvone which is also required in such formulations, the crude spicatone fraction need not be further purified for such uses.

For the analysis of the reaction mixtures obtained by the process of my invention, that is, spicatone in the presence of carvone, the infrared spectrophotometer is eminently suitable. The structural difference between the new compound and carvone involves the position of the ring double bond. In carvone, the bond is trisubstituted and is conjugated with the keto group. In spicatone, the ring double bond is disubstituted and is not conjugated with the keto or carbonyl group. Thus, by infrared, carvone shows among others, the absorption of a trisubstituted ethylenic bond and a conjugated keto group while the new compound shows a disubstituted ethylenic bond and a non-conjugated keto group. All of these absorptions occur at separate wave lengths so that it is possible to detect very small amounts of one of the pair in the presence of the other. Besides the above absorptions, a characteristic of both isomers is the absorption characteristic for a terminal methylenic bond in the 8,(9) position.

Binary mixtures of carvone and spicatone can also be assayed by index of refraction.

The preparation of the new compound from carvone proceeds with retention of optical activity. Thus, 1-carvone $[\alpha]_D$—60° gives 1-spicatone $[\alpha]_D$—163.9°, while carvone of other rotations yields spicatone of optical rotation corresponding in direction and proportional in magnitude to those of the carvone taken.

As indicated heretofore, spicatone has a lower boiling point ($b_5$=67° C. as compared to carvone $b_5$=83° C.) so that on distillation the vapor tends to be enriched in spicatone and it can be removed from the mixture by suitable distillation equipment. By removing the spicatone from the equilibrium mixture, further product is produced from the carvone and this process theoretically continues until all of the carvone has been converted. In practice, however, at least a small amount of both carvone and spicatone pass irreversibly to carvacrol, or they resinify, so that a 100% yield is not obtainable. Nevertheless, good results are obtained as shown in my examples above. Thus, the examples demonstrate the preparation of 5,8(9)-p-menthadiene-2-one, by treating carvone with an enolization catalyst, preferably a nitrogen base catalyst, removing the spicatone either intermittently or continuously and returning the unchanged carvone to the catalyst for retreatment.

Spicatone has a fresh green and grassy character on top of a basic mintiness. Its flavor is very different from that of carvone or of any other known component of spearmint oil, and it provides an aroma of freshly crushed mint leaves which is always lacking in artificial spearmint oil and frequently lacking or weak even in natural oils. Thus, it is useful for providing the desired character in the compounding of artificial spearmint oil, or it can be used to upgrade the flavor of poor quality natural oils. As a new compound, it can be used to flavor toothpaste, mouth washes, antiseptics, confections, etc., where a full green and minty flavor or odor is desired, and especially where the known natural or synthetic chemicals do not give the desired odor or flavor.

Having thus provided a process and a preferred embodiment thereof for the preparation of 5,8(9)-p-menthadien-2-one, it is realized that modifications can be made falling within the scope of my invention and the appended claims.

Having thus described my invention, I claim:

1. 5,8(9)-p-menthadiene-2-one.

2. The process for subjecting carvone to enolizing conditions and removing 5,8(9)-p-menthadiene-2-one from the mixture as formed which comprises heating said carvone in a still under substantially anhydrous conditions and in the presence of an enolization catalyst at a temperature of from about 90° to 150° C. at subatmospheric pressures.

References Cited in the file of this patent

Grignard et al.: Bull. Soc. Chim. de France, vol. 49, pp. 23–42 (1931), pages 35–36 relied on.